June 11, 1940.  C. E. FRASER  2,204,534
SEAL FOR SAND FILTER CLEANING MECHANISM
Filed July 9, 1937  2 Sheets-Sheet 1
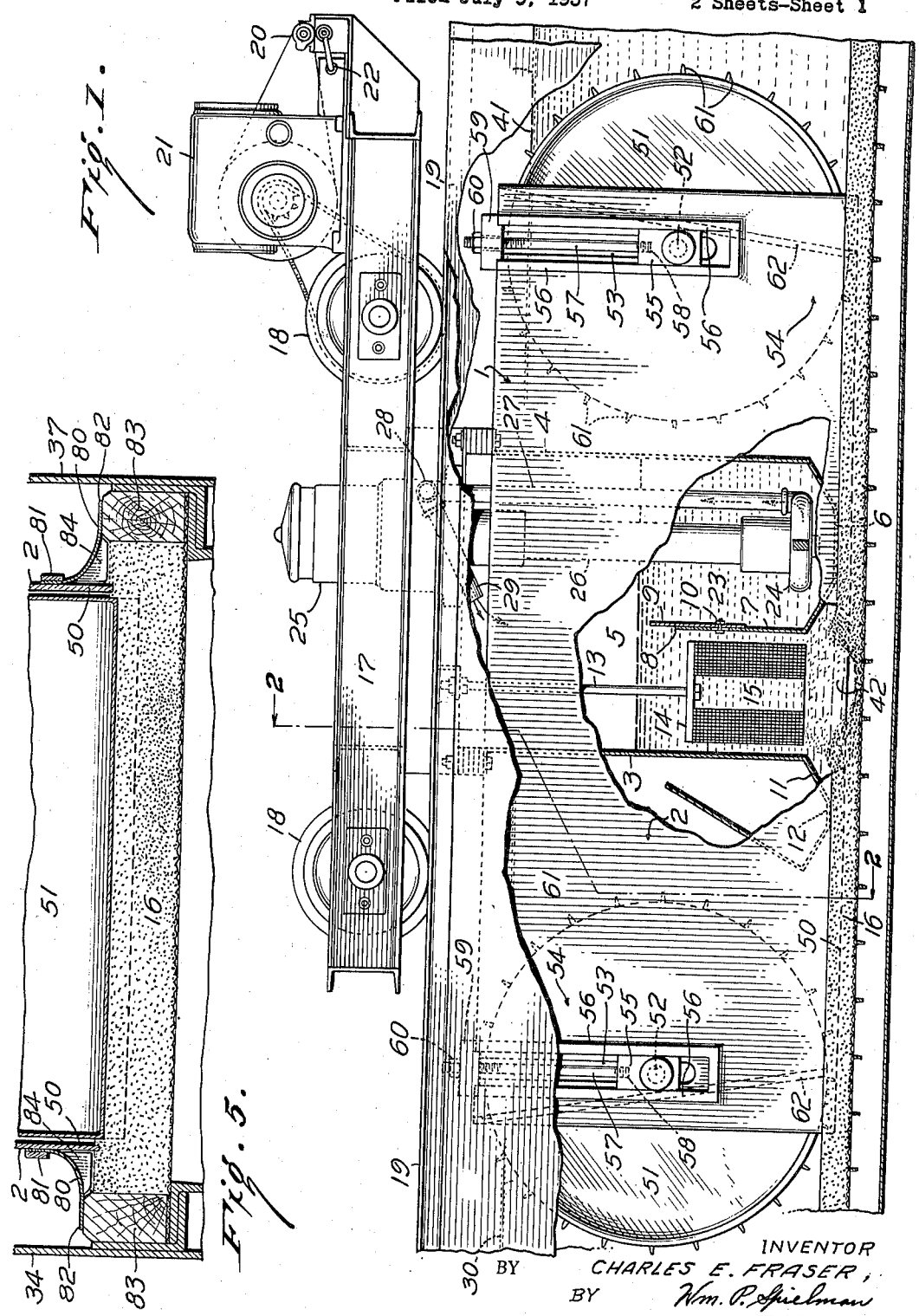
INVENTOR
CHARLES E. FRASER,
BY
Wm. P. Spielman
ATTORNEY.

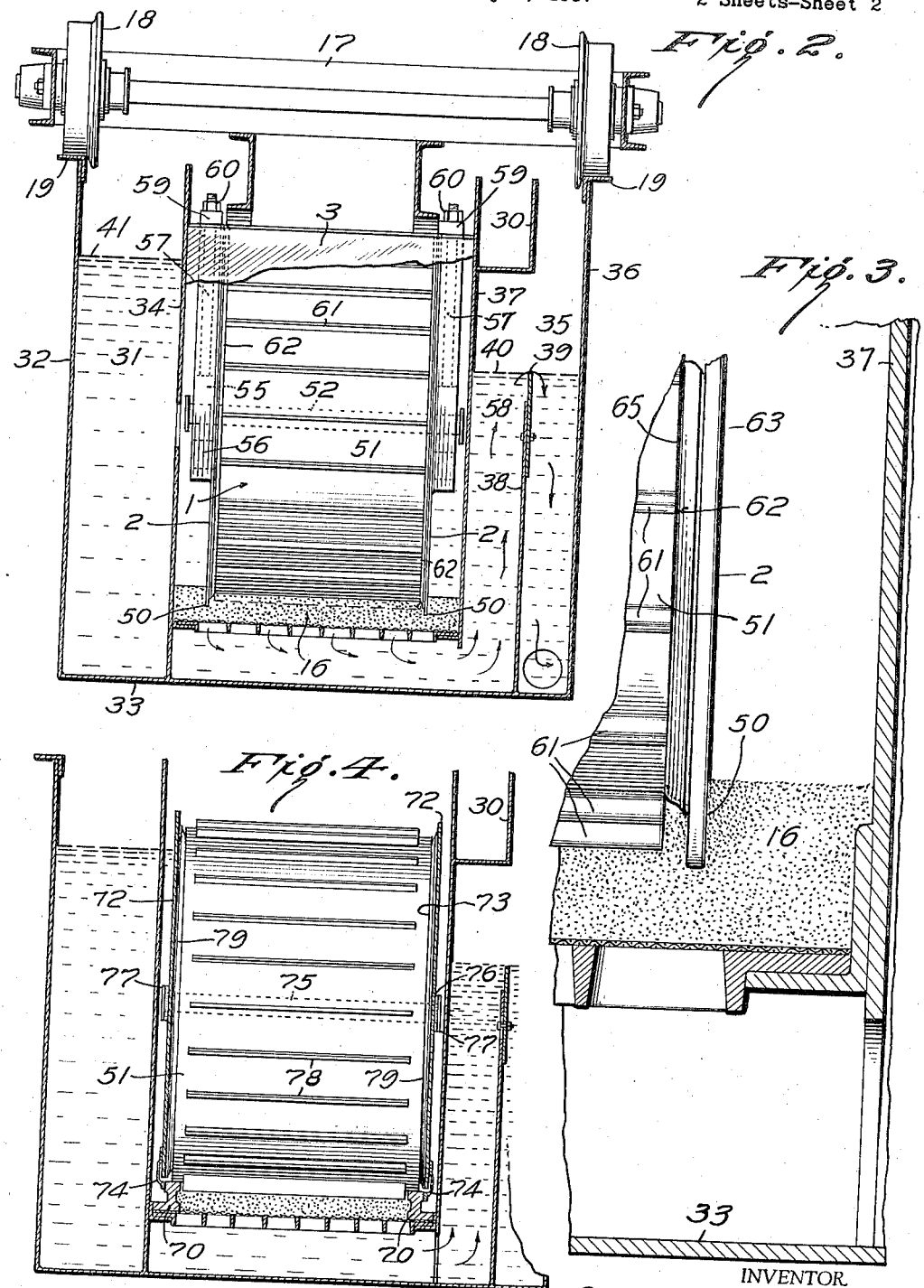

Patented June 11, 1940

2,204,534

UNITED STATES PATENT OFFICE 2,204,534

SEAL FOR SAND FILTER CLEANING MECHANISM

Charles E. Fraser, Kew Gardens, N. Y., assignor to Filtration Equipment Corp., New York, N. Y., a corporation of Delaware Application July 9, 1937, Serial No. 152,771

20 Claims. (Cl. 210—128)

This invention relates to cleaning devices for submerged filters of loose material of the type used in clarifying water or sewage, and more particularly to travelling cleaning devices of this type which travel over the surface of the filter bed either continuously or intermittently. Objects of the invention are to increase the effectiveness of the cleaner and particularly to prevent contamination of filtered effluent by admixture with dirt removed from the filter during the cleaning operation. A more specific object toward the accomplishment of these purposes is to provide a travelling cleaning device having a seal which will effectively prevent the influx or escape of water or sewage from under the lower edges of the cleaner during the cleaning operation.

In rapid filtration processes and particularly in the clarification of sewage and industrial wastes by rapid filtration, it is necessary to use a relatively thin bed of filtering material such as sand and relatively high rates of flow. In such an installation, the thin bed of filtering material therefore must hold back and retain relatively large amounts of solid material per unit of time, and without a more or less continuous cleaning it soon becomes clogged and offers a greatly increased resistance to the flow of water therethrough. This resistance, in turn, cuts down the rated capacity of the filter or else increases back pressure to a point where a much greater operating head is necessary.

By reason of the necessity of more or less continuous cleaning, modern submerged filters both of the upflow and downflow type are so designed and constructed that the clarified effluent from the filter passes out of the filter chamber at a level above that of the filter bed, thus ensuring that the filter will be covered by one or two feet of liquid at all times. The flow of impure water or sewage to be clarified reaches the influent side of the filter bed under a hydrostatic head or pressure which represents a sufficient water head above that of the outflow to overcome the flow resistance due to the filter, and thus causes the liquid to flow through the filter bed by reason of its hydrostatic pressure. A travelling cleaning device is mounted over the filter bed on an arm or trackway and moves continuously or intermittently along the length of the filter bed. The cleaner is provided with a cleaning mechanism for agitating the sand or other loose material of the filter bed and for removing the accumulated dirt and impurities therefrom, preferably by a washing operation, and for discharging the impurities from the cleaner in the form of an aqueous suspension known as wash water. There are a number of known cleaning devices of this nature which are now used for sand filters of the submerged type, some of which operate merely by mechanical agitation of the sand, others by the injection of jets of water into the sand, and still others by the agitation of magnetite sand or other magnetic material by means of an intermittently operating electromagnet. However, all the cleaning devices of which I am aware operate upon the principle of agitating successive portions of the filter bed and withdrawing the accumulated impurities therefrom in the form of a water suspension, and it is an object of my invention to improve the effectiveness of any cleaner of this type by preventing admixture of the wash water used therein with the filtered effluent.

For greater convenience my invention will be described in conjunction with the type of filter and cleaning mechanism which is described in the Laughlin et al. Patent No. 1,872,759, but it should be understood that this description is merely representative of one of a number of cleaning devices in conjunction with which it may be used. After describing the invention, and the best embodiment of which I am at present aware, I shall point out the underlying principles thereof as applied to both upflow and downflow types of filters, and it is understood that the invention in its broader aspects may be employed wherever these principles are applicable.

In the accompanying drawings, the invention is shown as being applied to a cleaning device for a downflow filter of the type described in the patent above referred to, and details of the filter, the structure of the setting tank and the combination therewith of a submerged filter will be found in this patent. In the drawings:

Fig. 1 is a side view of a filter provided with a cleaning mechanism and a travelling carriage therefor with parts broken away, showing sections of the filter canal, the filter, and the travelling cleaner with one embodiment of the present invention applied thereto.

Fig. 2 is a vertical section on the line 2—2 of Fig. 1 looking in the direction of the arrows.

Fig. 3 is an enlarged detail of the lower right hand portion of a part of Fig. 2, showing the vertical seal for the sealing drum.

Fig. 4 is a vertical section similar to that of Fig. 2, but showing a modified mounting for the cleaner which may be used in conjunction with the present invention, and a modified longitudinal seal.

Fig. 5 is a vertical section through a modified form of filter bed and cleaner mechanism, showing a modified longitudinal seal.

Referring to Fig. 1, the filter cleaning mechanism and travelling carriage therefor are similar to those shown in the Laughlin et al. Patent No. 1,872,759 referred to above. The cleaner consists of a cleaner tank 1 having side walls 2, a forward cleaner partition 3 and a rear cleaner partition 4, the spaces between the side walls and the front and rear partitions constituting a cleaner caisson 5. The rear cleaner partition is preferably provided with a bottom plate 6 which may be formed integral therewith and terminate in an upwardly extending baffle 7, which is provided at its upper end with an overflow edge 8 extending across the full width of the caisson between the side walls 2. In order to permit regulation of the water level within the caisson, the overflow edge 8 may be effectively raised or lowered by means of an adjustable weir plate 9, which in the modification shown is attached to the baffle 7 by nuts and bolts 10. The forward cleaner partition 3 is preferably inclined outwardly at its lower edge as at 11 and terminates in a leveling apron 12 which serves to level off the sand of the filter bed as the cleaner travels thereover. It will be noted that this same purpose is also accomplished by the inclined faces of the bottom plate 6, so that the lower portions of the cleaner function to level off the sand of the filter bottom during both forward and backward movements of the cleaner.

Within the opening between the forward cleaner partition 3 and the baffle 7 is mounted as by rods 13, an agitator 14 for creating a localized disturbance in the sand of the filter bottom. In the modification shown, this agitator is in the form of an electromagnet or solenoid 15 for operation in conjunction with a filter bed 16 of magnetite sand or other magnetic material of 10–40 mesh, but it is understood that this type of agitator is only one example of a number that may be used. The use of an electromagnet in the form of a solenoid together with a filter bed of magnetic material has a number of advantages in operation not found in other cleaners of the mechanically agitated or water jet type, and for this reason it constitutes a preferred type of agitator with which the present invention may be used, but it is understood that the invention in its broader aspects is not limited thereto.

The cleaning mechanism is supported by a travelling carriage 17, which is mounted on wheels 18 rolling on a track 19 above the filter canal. It is understood, of course, that in the case of circular filters operating in or around a circular clarification tank, a rotatable supporting truss may be used as is well known in the art, but as this forms no part of the present invention it is not illustrated. In the modification illustrated the moveable carriage 17 is provided with a chain drive operated by an electric motor through suitable reduction gears 21. The solenoid 15 is intermittently energized by a suitable timer consisting of a switch that makes an electric contact when the arm 22 is depressed by the cam 20, which in turn is operated from the reducing gears as shown. The starting switch of the motor is controlled by a float inserted in the influent channel of the filter: the rising of this float by reason of increased back pressure in the filter due to the accumulation of impurities therein will start the motor.

Within the caisson 5, and preferably located near the bottom of a chamber 23 formed between the rear cleaner partition 4 and the baffle 7 is a centrifugal pump 24, which is driven by an electric motor 25 mounted on the carriage 17 through a drive shaft 26. The pump 24 discharges through a discharge pipe 27 which is provided with a lateral elbow 28 and discharges dirty water through the pipe 29 into a wash water launder 30 running along the upper edge of the filter canal, from which launder the wash water may be separately collected for treatment, such as with chemicals, for example with lime and ferric chloride or with aluminum sulfate after which it may be separately filtered, or it may be returned to the influent channel of the settling tank without this treatment.

The operation of the cleaner which has been described depends upon a localized reduction in the resistance or back pressure of the filter to the passage of water therethrough at an area where the sand of the filter has been agitated and the inrush of water through this area in amounts sufficient to wash the impurities from the sand during its agitation. Referring to Fig. 2 of the drawings it will be seen that the filter is provided with an influent channel 31 which is formed between a side wall 32 and a part of the bottom 33 of the filter and a side wall 34 of the filter canal containing the filter bed. This channel 31 may be a separate passage, as shown, or it may be nothing more than a portion of the settling tank in conjunction with which such filters are usually operated, but in either case there is a substantial head of water therein to force the liquid through the filter against the back pressure thereof. On the effluent side of the filter there is an effluent channel 35, which is shown as being formed between an opposite side wall 36 of the filter and a side wall 37 of the filter canal but this channel 35 may also be entirely separate from the structure of the filter and may be some distance removed therefrom. In a downflow filter the important feature of the effluent channel 35 is that it provides a reverse hydrostatic pressure or "back head" which is less than the hydrostatic pressure in the influent channel 34 by an amount which is roughly equivalent to the back pressure or normal resistance of the filter to the flow of water therethrough, this back head being preferably created and regulated by a control weir 38 provided with an adjustable overflow edge 39 to regulate the water level 40. In an upflow filter, the back head is of less importance to the cleaning operation, as the pressural tide of water for the cleaning operation comes from the operating head on the influent side of the filter, but the necessity for sealing the cleaner is the same or even greater in this type of apparatus inasmuch as the cleaner tank is surrounded by water which has already been filtered.

In the operation of the cleaner tank on a downflow filter of the type which has just been described it has heretofore been the practice to provide relatively large flat surfaces such as the bottom plate 6 and the levelling apron 12 shown in Fig. 1 close to the surface of the filter and at either side of the area in which the sand of the filter bed is being agitated. These surfaces define an area or territory of resistance at the area being cleaned. When the sand is agitated or lifted there is a release of solids from the bed, these solids being transferred to and suspended in the stream of wash water which enters through the area of lessened resistance 42 (Fig. 1) in the filter bed. This wash water rises through the opening between the forward cleaner partition 3 and the baffle 7 and overflows the weir plate 9 into the chamber 23, from which it is removed by the pump 24.

In the case of an upflow filter, the operation of the cleaner is not substantially different but the cleaner tank containing the dirty wash water is surrounded by filtered effluent instead of unfiltered sewage or industrial wastes. In both cases, leakage of water into or out of the cleaner caisson constitutes a serious problem which interferes with the efficient operation of the cleaning mechanism.

In accordance with my invention, I provide means operative at each of the lower edges of the cleaner tank, and throughout the front and rear sections thereof, to form an effective seal to prevent the flow of water due to unbalanced pressure conditions. These means at the lower edges of the cleaner preferably take the form of projections which establish a sufficiently firm and extensive contact with the filter bed during the cleaning operation to check and eliminate the flow of water at these areas, and the invention in its broader aspects involves the provision of any suitable projections which will contact the filter bed in a manner to prevent the flow, infiltration or seepage of water thereunder.

In applying my invention to travelling cleaners which move horizontally over the filter bed I have found that, in addition to obtaining a satisfactory seal, there is a second difficulty which must also be overcome. This difficulty arises from the scraping and abrading action of the bottom plate 6 and the levelling apron 12 upon the loose sand of the filter bed. If these surfaces are moved in contact with the filter bed they will scrape the sand into the ends of the filter, and the constant attrition will grind the sand to such small size that much of it is lost in the wash water. This scraping action is, of course, most objectionable in rectangular filters provided with reciprocating cleaners, but the abrading action is encountered in both circular and rectangular filters. Accordingly, in the preferred modifications of my invention I provide non-scraping sealing means at the transverse edges of the cleaner.

In Fig. 1 of the drawings I have shown two types of projecting sealing means for the cleaner tank, one type being suitable only for those dimensions of the tank which are in the plane of its movement and the other type being operative to establish substantially a rolling contact with the material of the filter bed and being especially adapted for use in dimensions transverse to the plane of movement. The first type of sealing means may, in its simplest form, be constituted by downwardly projecting extensions 50 of the side walls 2 of the tank, these extensions being of a depth sufficient to embed themselves within the sand of the filter and prevent the passage of water. The transverse sealing means are preferably in the form of drums 51 provided with axles 52 which are received in slots 53 cut in extensions 54 of the side plates 2 of the cleaner, and preferably near the ends thereof. The slots 53 are preferably cut to a depth such that the drums are not supported by the cleaner when it is in operative position upon the filter, although the drums will of course be lifted when the cleaner is raised for a sufficient distance.

The axles 52 are journalled in blocks 55 which are slidably secured in guides 56 and limited against rising therein above a predetermined distance by rods 57 which fit into recesses 58 therein and are secured at their upper end to guide plates 59 by rods 60. The drums 51 are therefore provided with a full-floating mounting, which permits them to ride over and level off any uneven portions of the filter bed that may have been created by the cleaning operation, while excessive pressure upon the filter bed is prevented by the buoyancy of the drums when immersed in water. The drums or rollers 51 are so constructed that they displace only slightly less than their own weight of water, so that their submerged weight is not excessive, while their method of mounting permits a continuous and highly effective compacting of those portions of the filter bed which have just been stirred up and loosened by the cleaning operation.

In order to provide a more efficient seal, and particularly to prevent the seepage and infiltration of water through the top layer of sand which is in contact with the bottom of the drum, axial vanes or projections 61 are provided on the surface thereof. These projections extend across the entire face of each drum and impress themselves below the surface of the sand of the filter bed, thus providing a more efficient transverse seal and at the same time giving increased traction to the drum and aiding the rotation and compacting action thereof.

While the method of mounting the drums or rollers 51 permits a narrow clearance between the outer faces thereof and the inner faces of the extensions 54 of the side plates 2 of the cleaner, it is frequently of advantage to provide vertical seals for these areas in order to make the cleaner increasingly water tight. Such a vertical seal is shown in Fig. 2, and in greater detail in Fig. 3, and preferably consists of a wiper 62 of packing or resilient material such as bronze which is welded or otherwise secured as at 63 to the inner walls of the extensions 54 and presses against the outer faces 65 of the drums or rollers 51. This vertical seal extends from a point below the bottom of the drums 51 to a point that is well above the water level, and is mounted diagonally to avoid interference with the axle 52.

From the above it will be seen that the present invention completely seals the cleaner tank and its mechanism from the influx or escape of water above the filter. Three separate types of seal may be and preferably are provided; a longitudinal seal 50 which may be nothing more than a downward extension of the side walls 2 of the cleaner tank, forward and rear transverse seals which make rolling contact with the sand of the filter bed and serve the additional important function of compacting the material thereof and vertical seals which may take the form of packing or wipers to prevent the leakage of water between the roller seals and the sides of the tank.

In the modified form illustrated in Fig. 4, the drums or rollers 51 constituting the transverse seals are mounted upon rails 70, which are laid upon the foundations of the filter and retain the filter material between them. In this modification the rollers support the weight of the cleaner tank 1 and its accessories, and accordingly the supporting carriage 17 may be dispensed with. In its place, a superstructure (not shown) mounted upon the top of the cleaner is used as a foundation for the necessary pumps and driving motors, which make electric contact with trolley wires or electrified rails above the filter.

Leakage between the side walls 72 of the cleaner tank and the outer ends 73 of the drums may be prevented by the use of the wipers shown in Fig. 3, but I have shown a modified form of vertical seal which may be substituted if desired. This consists of a circular wiper of resilient material which is welded or otherwise attached to each of the outer ends 73 of the drums, as at 79, and which presses against the inner side wall 72 of the cleaner and makes a water-tight joint. The longitudinal seal consists of resilient extensions 74, of bronze or other suitable material, which are welded or riveted to the lower edges of the side walls 72 of the cleaner and press against the outer sides of the rails 70. The drums are provided with axles 75 which fit tightly in bearings 76 in the side walls 72 of the cleaner, suitable washers 77 being provided and the axial cleats 78 are cut away at their ends to provide clearance for the rails. This modification, which may be preferred over that of Fig. 1 in smaller and less expensive installations, contains rollers which are at the same time both transverse and vertical seals for the cleaner tank, and this provision of a combined horizontal and vertical seal forms another feature of the present invention.

In Fig. 5 I have shown an alternative type of longitudinal seal which is preferable in some respects to that illustrated in Figures 1 to 3. In installations employing a circular filter such as is used in conjunction with circular clarification tanks, the side walls 2 of the cleaner tank would necessarily have to be curved about the axis of rotation, as otherwise the extensions 50 thereof would exert a severe scraping action on the material of the filter bed. This scraping action also becomes objectionable in some installations using reciprocating cleaner tanks as the lower sealing edges 50 of the tank may have a tendency to form permanent tracks in the material of the filter bed and thus lower the effectiveness of the seal. In order to overcome these difficulties the modification of Fig. 5 provides resilient sealing flanges 80 which are bolted or welded to the lower portions of the sides 2 of the filter tank as at 81. These flanges are curved through an angle of 90° and press at their outer edges 82 upon wooden blocks or rails 83 which are inserted in the outer edges of the filter bed and rest upon the supports thereof. At each end of the cleaner tank, the metal of the sealing flange is bent downwardly as at 84 to provide a barrier against the inrush of water at these areas. These downwardly extending portions terminate short of the level of the filter bed in order to have no scraping action on the sand thereof. The modification of this figure may be used as a substitute for the extensions 50 of the side walls 2 but I have found in practice that they form a valuable addition thereto. In other words the cleaner tank may be equipped with both downwardly extending flanges 50 and resilient sealing flanges 80 and the joint operation of these two longitudinal seals provides complete protection against seepage or infiltration of water under the longitudinal edges of the cleaner tank.

In the foregoing specification, and in the subjoined claims I have referred to downwardly projecting means for establishing a sealing contact between the edges and ends of the cleaner tank and the filter bed. The meaning of this terminology can well be clarified by a consideration of the inherent characteristics of the longitudinal sealing edges 50 and the horizontal sealing rollers 51 and their axial fins or cleats 61.

The material of the filter bed is preferably a magnetite sand of 10–40 mesh and of a specific gravity in air of 5.1–5.2, although the invention may also be applied to cleaner tanks operating upon the agitating or water jet principle with ordinary quartz sand having a specific gravity of 2.6–2.7. In either case, however, the sand when immersed in water or sewage is much lighter and is easily displaced by objects moving through it or by strong currents of liquid; in fact, this is the principle upon which the operation of an agitating cleaner depends. It follows, therefore, that any effective sealing means between the cleaner tank and the filter bed must project at least a short distance into the sand in order to prevent blowing out of the seal by the unbalanced pressure inside or outside the cleaner as well as the more gradual action of currents of liquid at the surface of the filter which would rapidly open up a space by carrying sand along with them. It is of course apparent that an adequate seal may be formed by a member of substantial weight and area that projects only a short distance into the sand, as would be the case, for example, with the rollers 51 if the fins or lugs 61 were not used. However, it is impossible to establish an adequate seal to accomplish the purposes of the present invention merely by the provision of flat surfaces such as surfaces 6 and 12 moving in a plane close to the surface of the sand and exerting no pressure thereon, for these surfaces will not project into the sand for the required minimum distance to prevent the initiation of small streams of water that soon enlarge themselves into a steady flow. If these surfaces are lowered into pressural contact with the sand, in an effort to establish a seal, they will only abrade the sand and scrape it into the ends of the filter bed and leakage will start after a few days' operation. Even with cleaner tanks that always operate in the same direction (i. e., those operating in circular tanks) it is impossible to maintain a satisfactory seal at the front and rear ends of the tank by the operation of flat surfaces such as the surfaces 6 and 12 shown on Fig. 1 of the drawings, for unless these plates have sufficient clearance they will plough through the sand of the filter and displace it. Accordingly the term "projecting means" is used in the claims to designate projections which extend into the sand for the minimum distance referred to above, which is sufficient to prevent the inflow or outflow of water from the tank under the unbalanced hydrostatic pressures incident to the cleaning operation irrespective of their lateral dimensions, or which press against rails or blocks in the sand as in Figs. 4 and 5.

Although certain specific embodiments of the invention have been described, and although the invention has been illustrated as applied to certain specific types of cleaning mechanisms, it is understood that the principles of the invention may be applied to cleaning mechanisms of any known or approved type, and that any reasonable modifications or equivalents thereof may be used which fall within the scope of the subjoined claims.

What I claim is:

1. A reciprocating cleaner for rectangular submerged sand filters comprising in combination a moveable cleaner tank adapted to travel over successive portions of the filter bed, means within the tank for agitating and washing sand within the area covered thereby and for removing dirt washed from the sand, and means at the sides and ends of the tank projecting downwardly below the normal level of the filter bed and adapted to penetrate the sand of the filter bed for a sufficient depth and area to establish a sealing contact therewith when the cleaner is in operation, the end sealing means being rotative and carrying transverse cleats.

2. A travelling cleaner for sand filters comprising in combination a moveable cleaner tank adapted to travel over the filter bed and provided with means for removing impurities therefrom, and rotative sealing means extending across the ends of said tank and adapted to make substantially a rolling contact with the surface of the filter bed.

3. A travelling cleaner for sand filters comprising in combination a moveable cleaner tank adapted to travel over the filter bed and provided with means for removing impurities therefrom, projections on the lower side walls of the tank projecting below the upper level of the filter bed and constituting a longitudinal liquid seal therefor, and drums rotatably mounted between said side walls at the front and rear ends thereof and constituting a transverse liquid seal for the tank.

4. A travelling cleaner for said filters comprising in combination a moveable cleaner tank adapted to travel over the filter bed and provided with means for removing impurities therefrom, projections on the lower side walls of the tank projecting below the level of the filter bed and constituting a longitudinal liquid seal, drums rotatably mounted between said side walls and constituting a transverse liquid seal, and wipers between the side walls and the faces of the drums and constituting a vertical liquid seal for the tank.

5. A travelling cleaner for sand filters comprising a moveable cleaner tank adapted to travel over a filter bed with means for washing impurities from the sand and for removing the dirt thus washed out, from the tank, said cleaner including side seals and transverse seals, the latter comprising sealing drums rotatably mounted at the forward and rear ends of the tank and carrying transverse cleats adapted to engage the filter bed.

6. A travelling cleaner for sand filters comprising a moveable cleaner tank adapted to travel over a filter bed, with means for washing impurities from the sand, and means for removing the washed out impurities from the tank, said cleaner including side and transverse seals, the latter comprising a sealing drum rotatably mounted at each end of the tank, each drum having transverse cleats extending across its surface and adapted to penetrate a substantial distance into the sand of the filter bed.

7. A travelling cleaner for sand filters including a moveable cleaner tank adapted to travel over a filter bed, with means for removing impurities therefrom comprising in combination pairs of forward and rear extensions on the sides of said cleaner, a sealing drum rotatably mounted between each pair of extensions, and vertical seals between said drums and extensions to prevent the flow of water therebetween.

8. A travelling cleaner for sand filters comprising in combination forward and rear cleaner partitions, means between said partitions for agitating the sand and removing impurities therefrom, a pair of side walls of substantial height extending across, beyond and below said partitions and forming therewith a cleaner tank having projections below its bottom adapted to penetrate the sand of the filter and form therewith a longitudinal seal, drums of a substantial diameter journalled in the lateral extensions of said side walls, and transverse cleats on the surfaces of said drums extending below the upper level of the filter bed and adapted to penetrate a substantial distance into the sand of the filter when the cleaner is in operation.

9. A travelling cleaner for sand filters comprising in combination forward and rear cleaner partitions, means between said partitions for agitating the sand and removing impurities therefrom, a pair of side walls of substantial height extending across, beyond and below said partitions and forming therewith a cleaner tank having projections below its bottom adapted to penetrate the sand of the filter and form therewith a longitudinal seal, drums of a substantial diameter journalled in the lateral extensions of said side walls, and vertical seals between the drums and the side walls to prevent the flow of water therebetween.

10. A travelling cleaner for sand filters comprising in combination forward and rear cleaner partitions, means between said partitions for agitating the sand and removing impurities therefrom, a pair of side walls of substantial height extending across, beyond and below said partitions and forming therewith a cleaner tank having projections below its bottom adapted to penetrate the sand of the filter and form therewith a longitudinal seal, drums of a substantial diameter loosely journalled in slots in the lateral extensions of said side walls, vertical seals between the drums and the side walls, and transverse cleats on the surfaces of the drums.

11. In a clarification filter having an outlet for filtered effluent, a filter bed of sand submerged below the level of said outlet, a travelling cleaner adapted to move adjacent the filter bed and provided with means for agitating and washing the sand of the filter and means for removing the washed out dirt from the cleaner, and lateral and transverse sealing means the latter including cleats, projecting from the cleaner into the sand of the filter and forming therewith a seal for the cleaner which will cut off currents of water due to differences in pressure between the wash water inside the cleaner and the water outside the cleaner.

12. In a clarification filter having an outlet for filtered effluent, a filter bed of sand submerged below the level of said outlet, a travelling cleaner adapted to move adjacent the filter bed and containing means for agitating and washing the sand of the filter, projections extending downwardly from the sides of the cleaner and adapted to contact the filter bed and form therewith a longitudinal liquid seal, and rotatable drums across the ends of the cleaner and adapted to contact the filter bed and form therewith a transverse liquid seal.

13. In a clarification filter having an outlet for filtered effluent, a filter bed of sand including a rail at each side thereof submerged below the level of said outlet, a travelling cleaner adapted to move adjacent the filter bed and containing means for agitating and washing the sand of the filter, projections at the sides of the cleaner adapted to contact said rails, and rotatable drums across the ends of the cleaner and adapted to contact the filter bed and form therewith a transverse liquid seal.

14. In a clarification filter having an outlet for filtered effluent, a filter bed of sand submerged below the level of said outlet and including a rail at each side thereof, a travelling cleaner adapted to move adjacent the filter bed and containing means for agitating and washing the sand of the filter, pairs of forward and rear extensions on the sides of said cleaner, and rotatable sealing drums adapted to contact the sand of the filter journalled in said extensions and adapted to roll on said rails.

15. In a clarification filter having an outlet for filtered effluent, a filter bed of sand submerged below the level of said outlet, a travelling cleaner adapted to move adjacent the filter bed and containing means for lowering the level of water therein and discharging therefrom a flow of wash water entering from the opposite side of the filter and lateral and transverse sealing means including cleats, projecting from the cleaner into the sand of the filter and forming therewith a seal for the cleaner to prevent commingling of the wash water and water outside the cleaner.

16. In a clarification filter having an outlet for filtered effluent, a filter bed of sand submerged below the level of said outlet, a travelling cleaner adapted to move adjacent the filter bed and containing means for lowering the level of water therein and discharging therefrom a flow of wash water entering from the opposite side of the filter, projections extending downwardly from the sides of the cleaner and adapted to contact the filter bed and form therewith a longitudinal liquid seal, and rotatable drums across the ends of the cleaner adapted to contact the filter bed and form therewith a transverse liquid seal.

17. In combination, a filter bed, a cleaner caisson adapted to travel over the bed and provided with means for creating an area of agitation therein and for removing impurities caught by that portion of the filter bed, said cleaner caisson including sealing means engaging the filter bed to prevent influent outside the tank from leaking into the same between the tank and the filter bed, means for flowing influent onto the filter bed and for establishing a level over the bed of liquid to be filtered, means for flowing filtered effluent from beneath the filter and for establishing an effluent level, the influent level being higher than the effluent level whereby a predetermined depth of liquid to be filtered may be maintained on the filter bed and hence a predetermined hydrostatic head thereover, means establishing a wash water liquid level in the cleaner caisson, said level being lower than the effluent level, whereby when the cleaner mechanism is operating and an area of agitation and hence lessened resistance is created in the filter bed, the higher effluent level will tend to cause a back flow of filtered effluent through the area of lessened resistance in the filter bed and into the cleaner caisson, thus preventing the escape of wash water into the effluent.

18. The combination of claim 17 in which the means establishing an effluent level is an adjustable weir.

19. The combination of claim 17 in which the means establishing the level in the cleaner tank is an adjustable weir.

20. The combination of claim 17 in which the means establishing levels of effluent and liquid in the cleaner tank are adjustable weirs.

CHARLES E. FRASER.

CERTIFICATE OF CORRECTION.

Patent No. 2,204,534. June 11, 1940.

CHARLES E. FRASER.

It is hereby certified that error appears in the printed specification of the above numbered patent requiring correction as follows: Page 3, second column, line 43, for "of" second occurrence, read --or--; page 5, first column, line 26, claim 4, for the word "said" read --sand--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.